United States Patent [19]

Hattori

[11] Patent Number: 4,547,181

[45] Date of Patent: Oct. 15, 1985

[54] INTERLOCKING DRIVING BELT

[75] Inventor: Torao Hattori, Wako, Japan

[73] Assignee: Honda Giken Kogyo Kabushiki Kaisha, Tokyo, Japan

[21] Appl. No.: 587,431

[22] Filed: Mar. 8, 1984

[30] Foreign Application Priority Data

Mar. 12, 1983 [JP] Japan ............................. 58-40952

[51] Int. Cl.[4] ............................................. F16G 1/28
[52] U.S. Cl. ................................ 474/204; 474/202; 474/205
[58] Field of Search ............... 474/201, 202, 203, 204, 474/242, 205

[56] References Cited

U.S. PATENT DOCUMENTS

| 2,365,988 | 12/1944 | Abbott | 474/201 |
| 2,582,057 | 1/1952 | Mueller | 474/204 |
| 4,428,740 | 1/1984 | Moore | 474/242 |

FOREIGN PATENT DOCUMENTS

| 121350 | 4/1948 | Sweden | 474/242 |

Primary Examiner—James A. Leppink
Assistant Examiner—Frank H. McKenzie, Jr.
Attorney, Agent, or Firm—Armstrong, Nikaido, Marmelstein & Kubovcik

[57] ABSTRACT

An interlocking driving belt wrapped around a toothed driving wheel and a toothed driven wheel to transmit power from the former wheel to the latter wheel, comprising a plurality of toothed blocks having tooth-shaped portions capable of being meshed with tooth spaces on outer circumferential surfaces of both of the wheels, a plurality of rollers held rotatably among the toothed blocks, a flat endless belt member wrapped tightly around outer circumferential surfaces of the rollers, stopper plates fixed to the toothed blocks, each of which stopper plates contacts one of two adjacent toothed blocks to retain these two toothed blocks in predetermined positions, and roller-receiving recesses provided in both of side surfaces of the toothed blocks to hold adjacent rollers therein. This interlocking belt can be made in small dimensions and weight at a low cost and can be suitably used to transmit high torque at a high speed under both the dry and wet conditions. It also enables the number of parts, noise and power loss to be minimized.

4 Claims, 6 Drawing Figures

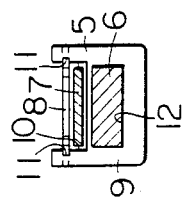
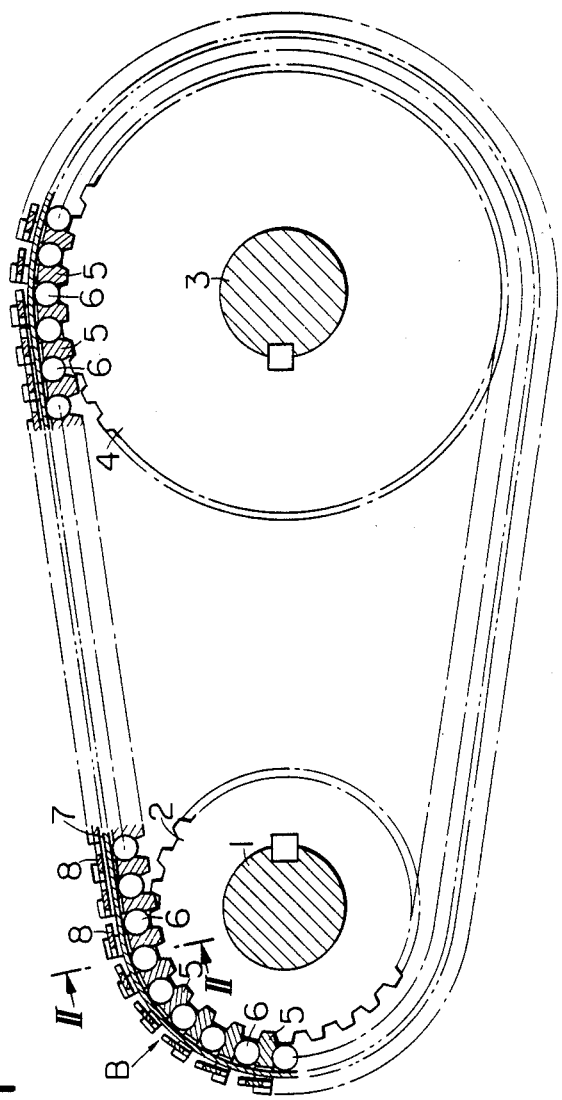
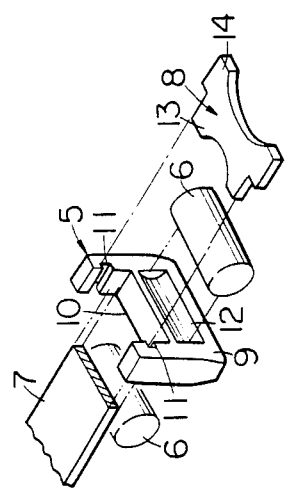

INTERLOCKING DRIVING BELT

BACKGROUND OF THE INVENTION

This invention relates to an interlocking driving belt wrapped in a meshed state around a toothed driving wheel and a toothed driven wheel, which are disposed in a spaced relationship to each other, so as to transmit power from the former wheel to the latter wheel.

Known interlocking driving belts include a cog belt, or a chain belt consisting of a roller chain or a HY-VO chain.

A principal portion of a cog belt generally consists of a non-metallic material, such as rubber and synthetic resin. Accordingly, a cog belt causes little noise and has small weight. A cog belt is suitably used as a dry type low-torque transmitting belt but not as a high-torque transmitting belt. Moreover, it cannot be used under the wet conditions, i.e. in an oil.

A chain belt can be used as a high-torque transmitting belt. Although a chain belt is advantageous in that it can be used under both the dry and wet conditions, it causes loud noise. When the torque to be transmitted is increased, the dimensions and number of the parts of a chain belt necessarily increase. This causes an increase in a total weight of a chain belt, so that the chain belt becomes liable to be influenced by the centrifugal force. Consequently, the number of revolutions per minute to be used of the chain belt is limited, and the manufacturing cost increases.

SUMMARY OF THE INVENTION

An object of the present invention, which has been developed in view of the above-mentioned facts, is to provide an interlocking driving belt which can be formed compact and light-weighted, causing little noise during an operation thereof, and is suitably used for the transmission of high torque, and which further can be rotated at a high speed and used under both the dry and wet conditions.

An interlocking driving belt according to one embodiment of the invention consists of a plurality of toothed blocks having tooth-shaped portions adapted to be meshed with tooth spaces on outer circumferential surfaces of toothed driving and driven wheels, a plurality of rollers held rotatably among the toothed blocks, and a flat endless belt member retaining the toothed blocks and wrapped tightly around outer circumferential surfaces of the rollers.

An interlocking driving belt according to another embodiment of the invention further includes a plurality of stopper plates fixed to the toothed blocks, each of the stopper plates being capable of contacting an adjacent toothed block to retain the two adjacent toothed blocks in predetermined positions.

The above and other, objects as well as advantageous features of the invention will become apparent from the following description of the preferred embodiments taken in conjunction with the accompanying drawings.

BRIEF DESCRIPTION OF THE DRAWINGS

FIGS. 1-3 illustrate a first embodiment of an interlocking driving belt according to the present invention, wherein:

FIG. 1 is a side elevational view of a belt driving system provided with the belt according to the present invention;

FIG. 2 is a sectional view taken along the line II—II in FIG. 1.

FIG. 3 is an exploded view in perspective of a part of the interlocking driving belt according to the present invention; and FIGS. 4-6 illustrate a second embodiment of an interlocking driving belt according to the present invention, wherein:

FIG. 4 is a side elevational view of a part of a belt driving system provided with the belt according to the present invention; FIG. 5 is an enlarged sectional view taken along the line V—V in FIG. 4; and FIG. 6 is an exploded view in perspective of the belt according to the present invention.

DESCRIPTION OF THE PREFERRED EMBODIMENTS

Figure 4:
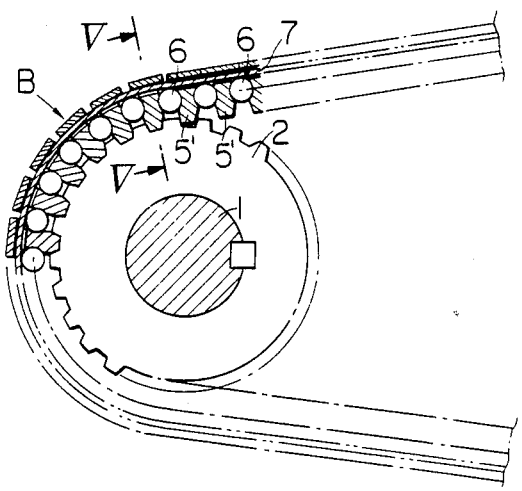

A first embodiment of the present invention will now be described with reference to FIGS. 1-3.

Referring to FIG. 1, an endless interlocking driving belt B according to the present invention is wrapped around a toothed driving wheel 2 fixedly mounted on a driving shaft 1 and a toothed driven wheel 4 fixedly mounted on a driven shaft 3. The rotation of the toothed driving wheel 2 is transmitted to the toothed driven wheel 4 via the driving belt B.

The driving belt B consists of a combination of a plurality of toothed blocks 5 . . . , a plurality of rollers 6 . . . , a flat endless belt member 7, and a plurality of stopper plates 8 . . . . The construction of these parts will now be described.

Each of the toothed blocks 5 has at its one end section a tooth-shaped portion 9 capable of being meshed with a tooth space in an outer circumferential surface of each of the toothed driving and driven wheels 2, 4. The toothed block 5 has at the other end section thereof a recess 10 through which the flat belt member 7 is inserted A pair of grooves 11, 11, in which a stopper plate 8 to be described later is fitted, are formed in opposite inner surfaces of the toothed block 5, which define the recess 10. The toothed block 5 is further provided in both side surfaces thereof with semicylindrical roller-receiving recesses 12, 12, with which rollers 6 to be described later are rotatably engaged.

Each of the rollers 6 is made of a metallic material, such as steel, in the form of a regular cylinder. The rollers used in this embodiment consist of needle rollers. Each of the rollers 6 is held rotatably as will be described later between roller-receiving recesses 12, 12 of adjacent toothed blocks 5, 5.

The flat endless belt member 7 consists of a metal strip having a rectangular cross section.

Each of the stopper plates 8 consists of a metal sheet, and has fitting portions 13 inserted into the grooves 11, 11, and projections 14 extending diagonally from one side surface of the toothed block 5.

The plural toothed blocks 5, 5 . . . and rollers 6, 6 . . . are arranged alternately in a row, and each of the rollers 6, 6 . . . is fitted rotatably in roller-receiving recesses 12, 12 in opposite side surfaces of two adjacent toothed blocks 5, 5. The flat endless belt member 7 is then inserted through the recesses 10, 10 . . . in the toothed blocks 5, 5 so as to be wrapped tightly around outer circumferential surfaces of the rollers 6, 6. The fitting portions 13, 13 . . . of the stopper plates 8, 8 . . . are then inserted into the grooves 11, 11 in the recesses 10, 10 . . . in the toothed blocks 5, 5 . . . to form the interlocking driving belt B according to the present invention. The diagonal projections 14 of each of the stopper plates 8 extend toward one of the adjacent toothed blocks 5 to contact the side surface of the latter and thereby prevent the toothed block 5 from being inclined with respect to the flat endless belt member 7.

When the interlocking driving belt B of the abovedescribed construction is wrapped around the toothed driving and driven wheels 2, 4 as shown in FIG. 1, the tooth-shape portions 9, 9 ... of the toothed blocks 5, 5 ... engage the spaces in these wheels 2, 4, and the outer circumferential surfaces of the rollers 6, 6 ... closely contact an inner surface of the flat belt member 7. The rotary force of the toothed driving wheel 2 is transmitted to the flat endless belt member 7 via the toothed blocks 5 and rollers 6, and the movement of the belt member 7 is then transmitted to the toothed driven wheel 4 via the rollers 6 and toothed blocks 5. During such an operation of the belt B, the outer circumferential surfaces of the rollers 6, 6 ... and the inner surface of the flat belt member 7 contact each other frictionally, so that no slipping occurs therebetween. In a straight-extending portion of the flat belt member 7, the diagonal projections 14 of each of the stopper plates 8 contact with the opposed side surface of one adjacent toothed block 5 to prevent the block 5 from being inclined.

Figure 6:
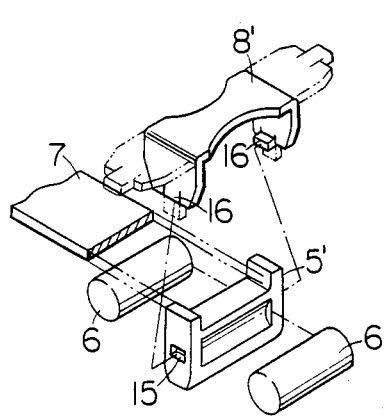
Figure 5:
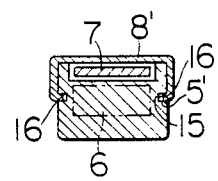

FIGS. 4-6 illustrate a second embodiment of the present invention. In the second embodiment, the construction of toothed blocks 5' and stopper plates 8' is different from that of the corresponding parts in the previously-described first embodiment. Namely, each of the toothed blocks 5' is not provided with grooves 11 referred to previously. It is provided with small recesses 15, 15 in both end surfaces of a base section of a tooth-shaped portion 9 thereof. On the other hand, each of the stopper plates 8' consists of a rectangular plate material having at both ends thereof small projections 16, 16, which can be fitted in the small recesses 15, 15, and which are formed integrally with the stopper plate 8'. The stopper plate 8' is bent in the cross-sectional shape of the letter "C" to hold outer end surfaces of a toothed block 5' while striding over the flat belt member 7 transversely. The small projections 16, 16 formed at both ends of the stopper plate 8' are then fitted in the small recesses 15, 15. The stopper plate 8' is thus set on the toothed block 5'.

In the second embodiment, the stopper plates 8' can be set on the toothed blocks 5' more easily, and the height of the toothed blocks 5' can be reduced. The total dimensions and weight of the second embodiment can be reduced more greatly than those of the first embodiment.

In the first and second embodiments, the toothed blocks 5, 5' and flat endless belt members 7 may consist of an arbitrary material; they may consist of a metal, a synthetic resin, or a synthetic rubber.

According to one embodiment of the invention, the interlocking driving belt can be formed as described above, by a plurality of toothed blocks, a plurality of rollers held rotatably among the toothed blocks, and a flat endless belt member wrapped tightly around the outer circumferential surfaces of the rollers. Accordingly, an interlocking driving belt having a smaller number of parts, simple construction and small weight can be provided at a low price. Moreover, this interlocking driving belt is rarely influenced by the centrifugal force, and can be used effectively for transmitting high torque at a high speed.

Since the toothed blocks and rollers are only in rolling contact with each other, the working resistance of the interlocking belt becomes low, so that the belt can be moved smoothly and lightly. This enables a power loss and noise to be minimized.

This interlocking driving belt can be used in both the dry and wet conditions by suitably selecting the materials of the driving and driven wheels, toothed blocks and flat belt member.

According to a second embodiment of the invention, each of the toothed blocks is provided with a stopper plate contacting one of adjacent toothed blocks to retain these two toothed blocks in predetermined positions. Accordingly, the toothed blocks can be retained in predetermined positions as they are kept spaced at a predetermined distance from the flat belt member, so that the toothed blocks are not inclined on the flat belt member. The toothed blocks are fitted in the spaces in the toothed driving and driven wheels accurately, smoothly and lightly at all times. Therefore, the second invention enables the noise and power loss reducing effect of the first invention to be further increased.

The present invention is not, of course, limited to the above embodiments; it may be modified in various ways within the scope of the appended claims.

What is claimed is:

1. An interlocking driving belt wrapped around a toothed driving wheel and a toothed driven wheel to transmit power from the former wheel to the latter wheel, comprising a plurality of toothed blocks having tooth-shaped portions capable of being meshed with tooth spaces on outer circumferential surfaces of both of said wheels, a plurality of rollers held rotatably among said toothed blocks, each roller of said plurality of rollers being positioned between two adjacent of said toothed blocks and a flat endless belt member wrapped tightly around outer circumferential surfaces of said rollers.

2. An interlocking driving belt according to claim 1, wherein each of said toothed blocks is provided in both of its side surfaces with roller-receiving recesses for holding adjacent rollers therein.

3. An interlocking driving belt wrapped around a toothed driving wheel and a toothed driven wheel to transmit power from the former wheel to the latter wheel, comprising a plurality of toothed blocks having tooth-shaped portions capable of being meshed with tooth spaces on outer circumferential surfaces of both of said wheels, a plurality of rollers held rotatably among said toothed blocks, a flat endless belt member wrapped tightly around outer circumferential surfaces of said rollers, and stopper plates fixed to said toothed blocks, each of which stopper plates contacts one of two adjacent toothed blocks to retain these two toothed blocks in predetermined positions.

4. An interlocking driving belt according to claim 3, wherein each of said toothed blocks is provided in both of its side surfaces with roller-receiving recesses for holding adjacent rollers therein.

* * * * *